June 29, 1937.   H. O. PETERS   2,085,670
AUTOMATIC TRAP NEST
Filed Dec. 16, 1935   4 Sheets-Sheet 1
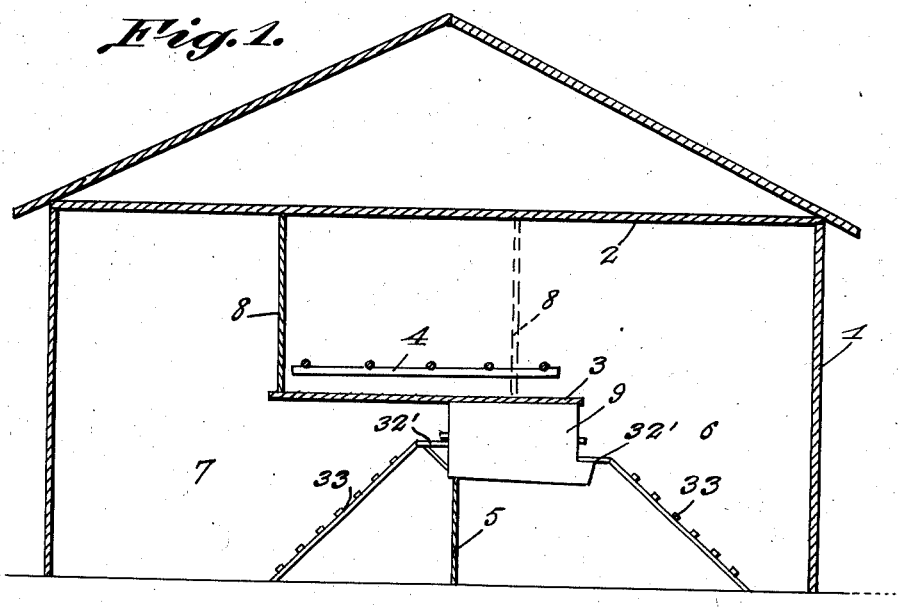
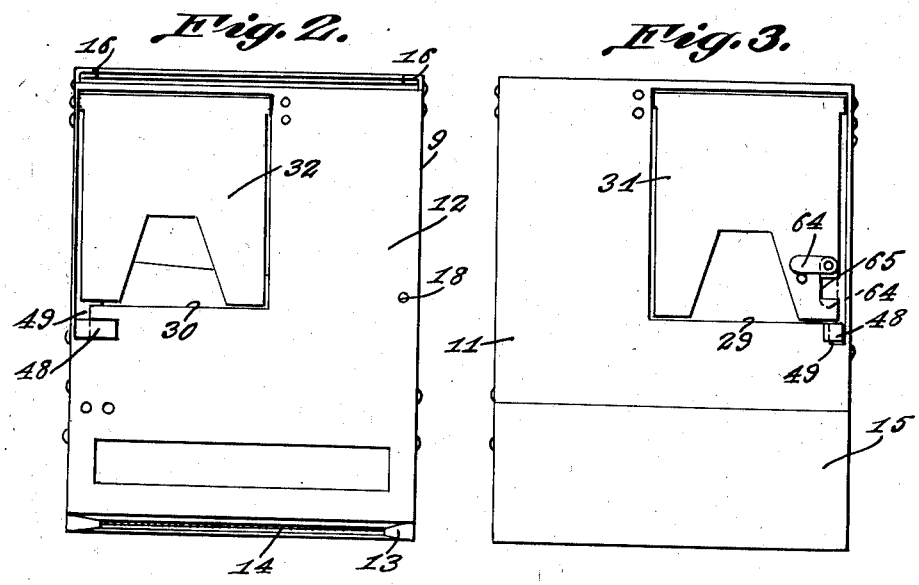
Henry O. Peters, INVENTOR
BY Victor J. Evans & Co.
ATTORNEY

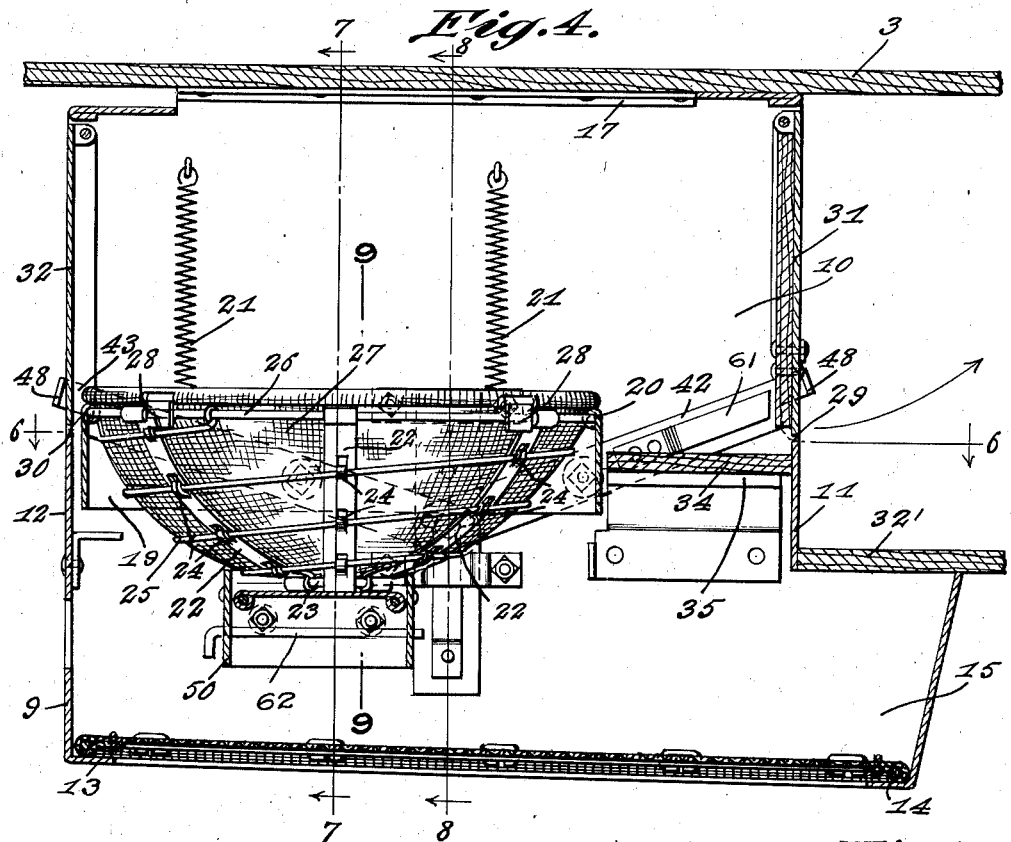
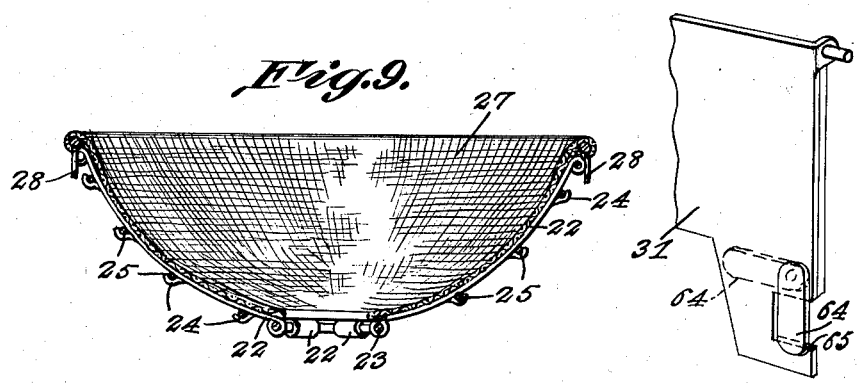

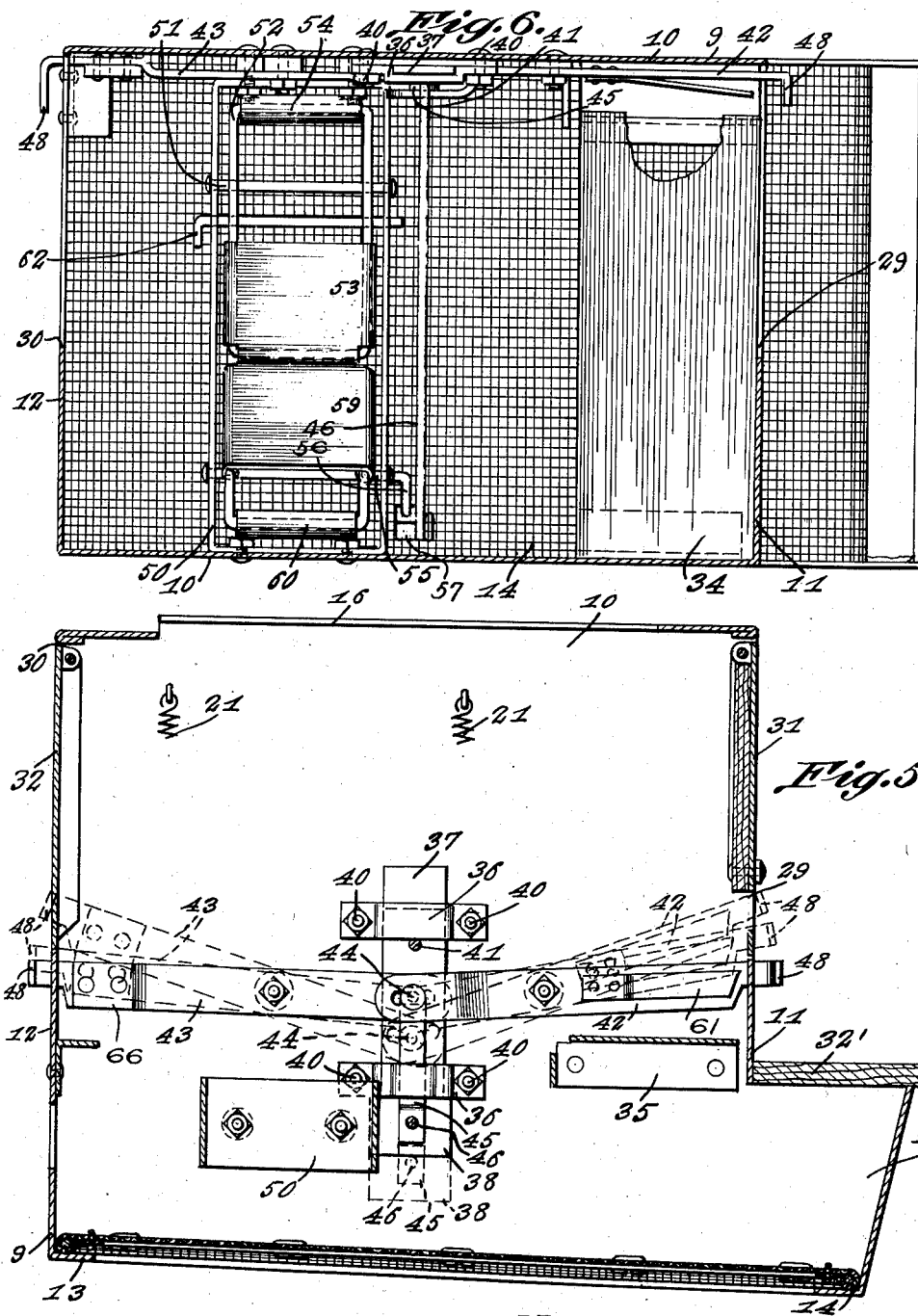

June 29, 1937. H. O. PETERS 2,085,670
AUTOMATIC TRAP NEST
Filed Dec. 16, 1935 4 Sheets-Sheet 4
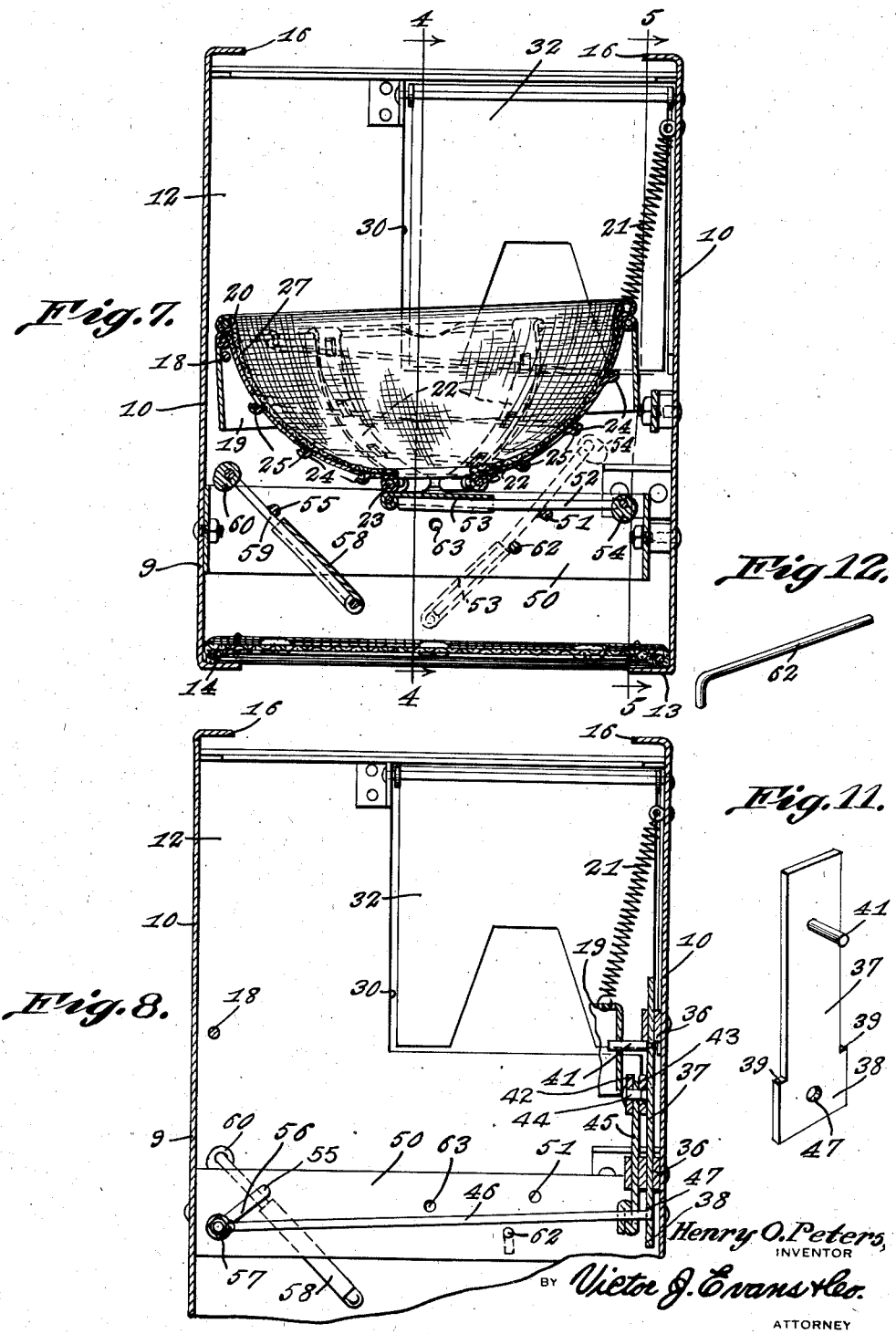
Henry O. Peters, INVENTOR
BY Victor J. Evans & Co.
ATTORNEY Patented June 29, 1937

2,085,670

UNITED STATES PATENT OFFICE 2,085,670

AUTOMATIC TRAP NEST

Henry O. Peters, Tacoma, Wash.

Application December 16, 1935, Serial No. 54,744

7 Claims. (Cl. 119—47)

This invention relates to trap nests, and its general object is to provide a trap nest that is automatic in its action, in that it requires no manual attention except to gather the eggs, even to the extent of segregating laying hens from the non-layers, thereby making it possible to keep an accurate egg record of the entire flock, so that the flock can be culled from time to time in an easy and expeditious manner, and with very little effort.

A further object of the invention is to provide a trap nest that automatically locks when in use, to an extent to prevent the hens while laying from being disturbed by other hens, and the laying hen is released by the egg she lays, but is compelled to enter the nest by one door and leave by the other, while a hen that does not lay must leave by the entrance door, and that feature brings about the segregation of the layers from the non-layers, which is essential to produce a flock of hens that marks the difference between success and failure in the poultry business.

Another object of the invention is to provide an automatic trap nest that can be instantly converted into a hand attended trap nest, so that the type of eggs layed by individual hens can be readily ascertained.

A further object of the invention is to provide an arrangement of partitions in the hen house, to form separate compartments for cooperation with the trap nest to bring about the segregation above referred to, and one of the partitions is movable to one position, to compel the non-layers to roost and feed separately from the layers and to another position to allow the layers access to the nests.

A still further object of the invention is to provide an arrangement of partitions in combination with the trap nest that enables the poultry man to produce a flock of egg laying hens, with minimum attention, and the trap nest is simple in construction, inexpensive to manufacture, and extremely efficient in use, operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a sectional view taken through a hen house constructed primarily for use with my trap nest, and shows the latter together with other parts in elevation.

Figure 2 is a rear view of my trap nest per se.

Figure 3 is a front view thereof.

Figure 4 is a sectional view taken approximately on line 4—4 of Figure 7, looking in the direction of the arrows.

Figure 5 is a sectional view taken approximately on line 5—5 of Figure 7, looking in the direction of the arrows.

Figure 6 is a sectional view taken approximately on line 6—6 of Figure 4, looking in the direction of the arrows.

Figure 7 is a sectional view taken approximately on line 7—7 of Figure 4, looking in the direction of the arrows.

Figure 8 is a sectional view taken approximately on line 8—8 of Figure 4, looking in the direction of the arrows.

Figure 9 is a sectional view taken approximately on line 9—9 of Figure 4.

Figure 10 is a fragmentary view of the entrance door and illustrates the keeper which is used in converting the automatic trap nest into a hand attended nest.

Figure 11 is a detail perspective view of the sliding bar for actuating the keeper levers.

Figure 12 is a detail perspective view of the removable pin which forms a part of the means for converting the automatic nest into a hand attended nest.

Referring to the drawings in detail, the reference numeral 1 indicates a laying or hen house that includes a ceiling 2, a roosting platform 3 and a roost, the latter being supported in any suitable manner above the platform 3.

In Figure 1 I have illustrated my trap nest as being secured to and suspended from the platform 3. It will be obvious that any number of trap nests are employed, it depending of course upon the size of the flock of hens, and extending from the trap nest as shown in Figure 1 to the floor of the house is a partition 5 which is permanent and divides the space below the platform 3 into separate compartments 6 and 7. A movable partition 8 is likewise employed and which extends from the ceiling 2 to the platform 3. The partition 8 can be moved to any position with respect to the platform and one of the positions is shown in dotted lines in Figure 1. The purpose of these partitions will be more fully set forth later in the description.

My trap nest includes a casing 9 which is preferably of rectangular configuration, and is provided with side walls 10 and front and rear walls 11 and 12. The bottom is provided with an inwardly extending flange 13 that acts as a supporting means to detachably receive a screen frame 14 that has secured thereto screen wire as shown, which provides the bottom, as well as ventilating means, as will be apparent.

The side walls 10 extend forwardly from the front wall at their lower ends to provide a bin like portion 15 having an open top and to which the eggs gravitate when laid, so that they can be readily removed from the nest.

Portions of the side walls extend above the rear wall, and the extending portions are bent inwardly to provide flanges 16 to be slidably mounted on cleats 17 secured to the underside of the platform 3, for securing and supporting the nest with respect to the platform, consequently, it will be seen that the nests are easily detachable from the platform so that access may be had to the interior thereof for cleaning or other purposes.

Extending longitudinally adjacent one of the side walls is a rod 18 that is fixed within the casing and pivotally mounted on the rod 18 is a frame 19 which forms a part of the nest proper. The rod 18 extends through one side portion of the frame 19, therefore the latter is pivoted for rocking movement for a purpose which will be later described, and the upper edge of the frame 19 is flanged as at 20. The free side portion of the frame 19 has connected thereto one of the ends of coil springs 21, while the opposite ends are fixed to the other side wall, as best shown in Figure 4, so that the frame is normally held elevated at an inclination.

The nest proper likewise includes a plurality of strips 22 disposed at a curved inclination with their lower ends fixed to a ring 23 in a manner whereby the strips radiate therefrom, and the strips are provided with ears 24 cut therefrom to provide clamping members through which is threaded a coil of wire 25 to provide with the strips 22 a concaved nest portion. The upper convolution of the wire 25 is secured to a ring 26, while the lower convolution is fixed to the ring 23, and the ring 26 is secured to the frame 19, so that the concaved nest portion will depend therefrom, as best shown in Figure 4.

The nest portion is provided with a lining 27 following the shape thereof and the lower end of the lining has an opening therein, coinciding with the opening of the ring 23, to allow an egg passage as will be apparent. The upper edge of the lining 27 is secured to a ring as shown, and depending from the latter are ears 28 that engage the outer surface of the ring 26 for detachably securing the lining with respect to the concaved nest portion as clearly shown in Figure 9. The ring 26 has the upper ends of the strips 22 fixed thereto, consequently, it will be seen that the ring 23, strips 22, coil of wire 21, ring 26, and lining 27 all cooperate to provide with the frame 19 a nest proper which is mounted for rocking movement, and is moved downwardly by the weight of a hen for a purpose which will be later described.

The front and rear walls 11 and 12 are each provided with door openings 29 and 30 respectively, and the door openings are closed by swinging doors 31 and 32 that are hinged at their upper ends to swing in a vertical plane. The doors 31 and 32 are provided with recesses extending upwardly from the lower ends thereof to provide ventilating openings and for observing purposes.

The door opening 29 is the inlet for the casing, while the opening 30 is the outlet therefor.

Extending from the front and rear walls and supported in front of the door openings thereof are step platforms 32' from which extend ladder members 33 which lead to the floor of the house 1, as best shown in Figure 1, so as to provide means whereby the hens can reach the trap nest for ingress and egress with respect thereto.

The frame 19 is disposed substantially laterally of the casing 9 and extends in close proximity to the rear wall, but the forward end of the frame 19 is spaced a considerable distance from the front wall and that space is bridged by a cross member 34 which is removably supported upon brackets 35.

Slidably mounted for vertical movement in brackets 36 is a bar 37 having an enlarged lower end 38 providing shoulders 39 to contact the lower bracket 36 to limit the upward movement of the bar, and the brackets 36 are of the U-type, with bolt and nut connections 40 securing the same to one side wall 10, as best shown in Figure 5.

The bar 37 is movable by the frame 19, through the instrumentality of a pin 41 which has its ends secured to the bar and the frame, as best shown in Figure 8.

The doors are each provided with latching levers that are pivotally secured to the last mentioned side wall intermediate their ends, and the latching lever 42 is provided for the front or inlet door 31, while the latching lever 43 is provided for the rear or outlet door 32, and the inner ends of the latching levers 42 and 43 are pivotally connected together at their inner ends by a pivot pin 44 which has mounted thereon the upper end of an arm 45 disposed between the levers 42 and 43. The arm 45 is slidably mounted and guided in the lower bracket 36, and the lower end of the arm 45 is enlarged, with an opening extending therethrough for the passage of the free end portion of a rod 46 which is reciprocated in a manner which will be presently apparent. The enlarged portion of the bar 37 is likewise provided with an opening 47 to receive the free end of the rod 46 at times during the operation thereof.

The latching levers 42 and 43 extend beyond the front and rear walls 11 and 12 and have their outer ends bent inwardly upon themselves to provide keepers 48 for disposal in the path of the doors. However, when the levers are in their normal position, the free end portions thereof are received in recesses 49 below the door openings, with the keepers arranged out of the path of the doors, as shown in full lines in Figure 5.

Traversing the casing and arranged to underlie the nest proper is a frame 50 which has its ends fixed to the side walls, and journaled in the sides of the frame 50 is a shaft 51 which has secured thereto the side arms 52 of a tripping member that is actuated by the eggs, and the tripping member includes a plate 53 normally arranged below the opening of the nest proper for closing the same as best shown in Figure 7. The plate 53 is fixed to the side arms and one end arm or portion, while the opposite end arm or portion has secured thereto a counterbalancing weight 54, to normally hold the plate in contact with the ring 23 for closing the egg opening.

Cooperating with the tripping member that includes the plate 53 is a second tripping member that is fixed to a crank arm 55, the latter being journaled in the frame 50 and has its crank portion 56 pivotally secured to the outer end of the rod 46, as best shown in Figure 8. The crank portion may have secured thereto a weight 57. The last mentioned tripping member includes a plate 58 that underlies the plate 53 when the parts are in normal position, and this tripping member which for distinction is indicated by the reference numeral 59 is likewise provided with a counterbalancing weight 60 for normally holding the same at an inclination below the plate 53, for disposal in the path of the eggs upon leaving the plate 53.

The latching lever 42 has an abutment strip 61 secured thereto for disposal in the path of the door 31 to prevent inward movement thereof when the parts are in certain positions, and the frame 19 is at all times arranged in the path of the door 32, consequently the latter can be swung outwardly only, but the door 31 can be swung in either direction when its keeper and abutment strip are arranged out of the path thereof.

A removable pin 62 bridges the frame 50 for disposal in the path of the tripping member that includes the side arms 52, to limit the downward movement of the plate 53, and the side members of the frame 50 are provided with openings to receive the pin 62 when in its normal position as shown in Figure 7, as well as openings 63 to receive the pin 62, when it is desired to arrange the same to retain the plate 53 in a position to close the egg passage, so that the automatic trap nest can be converted into a hand attended nest. I also provide a closure 64 that is pivotally secured to the door 31, for closing a notch 65 therein, as shown in Figures 3 and 10, the notch being adapted to allow the door 31 to be opened outwardly by a hen within the nest, when she does not lay an egg to actuate the tripping mechanism. When the member 64 is closed, as shown in full lines in Figure 10, it is arranged in the path of the keeper of the lever 42, therefore the door 31 cannot be opened outwardly, and the member 64 cooperates with the pin 62 in holding both of the doors closed to retain the hen within the trap nest until the latter is manually actuated to release the hen.

In the operation of my device as an automatic trap nest, the parts are arranged in normal position as shown in full lines in Figures 5 and 6, with the nest proper elevated at an inclination, and the door 31 can be swung in either direction while the door 32 can be swung outwardly. Assuming that a hen enters the door opening 29 by moving the door 31 inwardly on its pivot, then sets upon the nest proper, the weight of the hen will lower the nest proper which will result in the bar 37 being moved downwardly to carry the inner ends of the latching levers 42 and 43 accordingly, due to the fact, that the rod 46 is mounted in the opening 47 of the lever 37, while the outer ends of the levers are raised to the uppermost dotted line position of Figure 5, for disposing the keeper 48 of the door 32 in the path thereof, and the abutment 61 in the path of the door 31, so that the latter cannot be moved inwardly, consequently the laying hen cannot be disturbed by other hens, and she cannot open the door 32. However, in the event she fails to lay an egg, she can open the door 31, as the notch 65 is in the path of the keeper of that door.

If the hen upon the nest lays an egg, the latter will pass through the egg passage and contact the plate 53 of the tripping member thereof which lowers the egg gently upon the plate 58 of the tripping member 59, it being obvious that the weight of the egg is slightly heavier than the counter-balancing weights 54 and 60. When the weight of the egg has moved the tripping member 59, such action will rock the crank arm 55 which pulls upon the rod 46 to remove the free end thereof out of the opening 47 of the bar 37 thereby releasing the arm 45, with respect to the bar 37, allowing the inner ends of the latching levers 42 and 43 to rise, as the lever 43 is weighted as at 66 adjacent its outer end, and the lever 42 is likewise weighted at its outer end by the abutment member 61, consequently the outer ends will be lowered to the position shown in the lowermost dotted lines of Figure 5, so that the keeper for the door 32 is arranged out of the path thereof to allow the hen to pass through the door opening 30 and thereby from the trap nest.

The hen must pass through the door opening 30 when she lays an egg, as the lever 42 remains in a position, with its keeper 48 in the path of the door 31, until the weight of the hen is relieved from the nest proper, but when she leaves the nest through the opening 30, all of the parts including the keepers 48 and abutment member 61 of the lever 42, return to their normal position, as shown in full lines in Figure 5, so as to allow another hen to enter through the opening 29.

When it is desired to convert the trap nest to a hand attended nest, the closure 64 is moved from its dotted line position of Figure 10 to the full line position thereof to close the notch 65, it being obvious that the weight of the hen upon the nest proper will retain the levers in a position so that the doors cannot be opened, and in order to prevent the tripping means from operating, the pin 62 is disposed in the openings 63, consequently it will be seen that the hen must be manually released.

Again, referring to Figure 1, it will be obvious that the hens that lay after passing through the trap nest find themselves in the compartments 7, while the hens that have gone into the trap nest and not laid will return to the compartments 6. During the day approximately sixty to seventy-five per cent of the flock will pass through the nests. At the end of the day or evening feeding time the attendant gathers and counts the eggs, and by the count he knows the exact number of hens in each compartment and the grain is put out accordingly. At that time the attendant also moves the movable partition 8 toward the front of the roost, or to the position as shown in dotted lines in Figure 1, to leave sufficient roosting space to accommodate the hens which have laid. After the hens have gone to roost he can then check the number of hens that have not laid, and make a record thereof in any suitable manner. The partition 8 is then moved back to its original position, so that the hens that have laid will again be in the compartments 6 when they leave the roost. Upon inspecting the records, it can be easily ascertained which hens are not laying, consequently they can be removed from the flock, therefore it will be seen that my trap nest in combination with the partition arrangement makes it possible to keep an accurate egg record and to cull the flock from time to time without fear of removing any of the laying hens. It will of course be understood that each of the hens has suitable identification means, from which the records are kept.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An automatic trap nest comprising a casing having inlet and outlet openings, normally closed and hen opened swinging doors for the inlet and outlet openings and having ventilating means therefor, means for controlling the opening of the doors and including means movable into and out of the path thereof, nest means including a frame mounted for rocking movement in the casing, a lining for the nest means, releasable means of connection between the frame and the controlling means for moving the latter when pressure is applied or removed by the hen with respect to the nest means, and egg actuated means including means for releasing the means of connection to allow movement of the controlling means independent of the frame.

2. An automatic trap nest comprising a casing of rectangular configuration and having inlet and outlet openings in the end walls thereof, means for securing the nest in position for use, ventilated doors mounted for swinging movement and being normally closed and adapted to be opened by hens, means for controlling the opening of the doors and including levers extending exteriorly of the casing, keepers on the ends of the levers for disposal in the path of the doors to prevent outward opening thereof, nest means within the casing and including a frame mounted for rocking movement, releasable connecting means between the frame and the levers for actuating the latter, said frame being arranged in the path of the door of the outlet opening to prevent inward movement thereof, means carried by one of the levers to prevent inward movement of the door for the inlet opening, and egg actuated means disposed below the nest means and including means for releasing said connecting means to permit the levers to operate independent of the operation by the frame.

3. An automatic trap nest comprising a casing having inlet and outlet openings, ventilated normally closed and hen opened swinging doors for the inlet and outlet openings, means for controlling the opening of the doors and including levers pivotally mounted intermediate their ends and having their free ends extending through the casing, keepers on the free ends for disposal in the path of the doors to prevent outward opening thereof, means on one lever to prevent inward opening of the inlet door, nest means including a concaved portion having an egg opening in its bottom, a frame carrying the concaved portion and mounted for rocking movement, means of connection between the frame and the levers for operating the latter, egg-tripped means arranged below the egg opening and having connection with the levers to release the same for allowing independent movement thereof, means to render the egg-tripped means inactive and manually operated means cooperating with the rendering means to convert the automatic nest into a hand attended nest.

4. An automatic trap nest comprising a casing having inlet and outlet openings, normally closed and hen opened swinging doors for the inlet and outlet openings, means for controlling the opening of the doors and including means for disposal into and out of the path thereof, movable nest means within the casing, releasable means connecting the nest means and the controlling means for operating the latter when weight is applied and removed with respect to the nest means, and egg actuated means for releasing the connecting means to allow operation of the controlling means independent of the nest means.

5. An automatic trap nest comprising a casing having inlet and outlet openings, normally closed and hen opened swinging doors for the inlet and outlet openings, means for controlling the opening of the doors and including means for disposal into and out of the path of the doors, pivotally mounted spring supported hen actuated nest means, releasable means connecting the nest means and the controlling means, egg carrying and tripping means below the nest means and having connection with the releasable means for connecting and disconnecting the nest means with respect to the controlling means for operating the latter by the nest means and independent thereof.

6. An automatic trap nest comprising a casing having inlet and outlet openings, normally closed and hen opened swinging doors for the inlet and outlet openings, means for controlling the opening of the doors and including means movable into and out of the path thereof, hen actuated means, releasable means connecting the hen actuated means with the controlling means for operating the latter, egg actuated means for operating the releasable means to allow independent movement of the controlling means, manually movable means for the door of the inlet opening for disposal into and out of the path of the second means for said door, and means to render the egg actuating means inactive for cooperation with the manual movable means to prevent opening of either door so as to convert the trap nest to a hand attended nest.

7. An automatic trap nest comprising a casing having inlet and outlet openings, normally closed and hen operated swinging doors for the openings, levers pivotally mounted within the casing and to each other, keepers on the outer ends of the levers for disposal in the path of the doors to prevent outward movement thereof, abutment means on one of said levers and for disposal in the path of the inlet door to prevent inward movement thereof, an arm mounted for slidable movement and having the levers pivotally connected thereto, spring supported pivotally mounted nest means, a slidably mounted bar secured to the nest means, egg carrying and tripped means to receive an egg from the nest means, and a rod secured to the egg carrying and tripped means and to the arm respectively and having releasable connection with the bar for operating the levers upon movement of the nest means and to be released from the bar to permit independent movement of the levers, and said nest means being arranged in the path of the outlet door to prevent inward movement thereof.

HENRY O. PETERS.